United States Patent Office 3,102,839
Patented Sept. 3, 1963

3,102,839
GERMICIDAL COMPOSITIONS
Otto E. Neracher, Mount Vernon, and Murray W. Winicov, Flushing, N.Y., assignors to West Laboratories, Inc., Long Island City, N.Y., a corporation of New York
No Drawing. Filed Mar. 4, 1960, Ser. No. 12,688
13 Claims. (Cl. 167—17)

This invention relates to germicidal iodine compositions wherein iodine is complexed with cationic surface active agents having detergent properties. More particularly, the invention relates to complexes of iodine with a new class of surface active compounds which may be referred to as salts and quaternary ammonium derivatives of γ-alkylated phenoxy-β-ethoxylated hydroxy-di-N-substituted propylamines.

The new iodine complexes in accordance with the present invention exhibit a unique combination of properties heretofore found only in part in certain combinations or mixtures of nonionic surface active agent-iodine and cationic surface active agent-iodine complexes.

The iodine carriers or iodophors embraced by the present invention are themselves new surface active compounds which are separately disclosed and claimed in our co-pending application Serial No. 12,700, filed March 4, 1960. They may be represented by reference to the following formula for the tertiary amines:

(I)

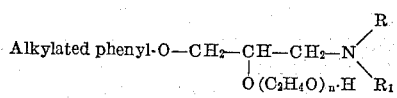

wherein the alkyl substituents in the alkylated phenyl group have a total of 6 to 18 carbon atoms, —NRR$_1$ is a secondary amino radical free of active hydrogen substituents and $n$ is an integer from 1 to 100. More particularly, the radical —NRR$_1$ may represent secondary amino radicals such as N,N-lower di-alkyl amino, N-lower alkyl N-aryl amino, N-lower alkyl N-aralkyl amino, N,N-diaralkylamino, piperidyl, morpholyl and pyrrolidyl radicals. The formulas for salts and quaternary ammonium derivatives of these tertiary amines need not be presented, as they can be readily visualized from the foregoing formula of the amines.

As disclosed in said co-pending application, preparation of these compounds can be economically effected starting with an alkylated phenol, reacting the same with an epihalohydrin under alkaline conditions to form an alkylphenylglycidyl ether of the formula

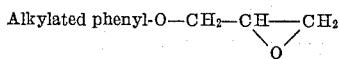

reacting this with a secondary amine at a temperature above about 50° C. to form a tertiary amine alcohol of the formula

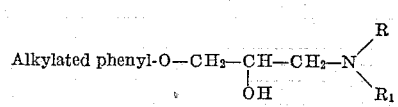

ethoxylating the secondary hydroxyl group in the presence of an alkaline catalyst to the extent desired in the tertiary amine product (I), and reacting the same with the appropriate acid or quaternizing agent to form the desired salt or quaternary ammonium derivative.

The starting alkylated phenol may be any phenol or cresol having one or more alkyl substituents with a total of 6 to 18 carbon atoms including, for example, tripropyl phenol and cresol, isomeric dibutyl and diamyl phenol and cresol, and secondary or tertiary isomeric heptyl, octyl, nonyl, decyl, undecyl, dodecyl, tetradecyl, cetyl and octadecyl phenol and cresol. The alkylated phenol is reacted with a molar excess of a suitable epihalohydrin such as epichlorohydrin or epibromohydrin by slowly adding to a warmed (75° to 95° C.) mixture thereof one mol of alkali such as sodium hydroxide in aqueous solution, while keeping the pH of the reaction mixture below about 10. The oily product, after separation from salts precipitated in the reaction, washing with water and slightly acidified water to remove excess alkali, and evaporation under reduced pressure to remove excess epihalohydrin, contains a mixture of alkylphenylglycidyl ether and β-hydroxy-3-(alkylphenyl)-propyl halide as a by-product. Treatment of this mixture with aqueous alkali and working up as before, followed by distillation under reduced pressure effects conversion of the by-product to the desired alkylphenylglycidyl ether, which is directly recovered with a purity in excess of 90%.

The alkylphenylglycidyl ether is then reacted with a molar equivalent of a secondary amine by adding the amine slowly while maintaining a reaction temperature of about 75–80° C. or somewhat higher with certain amines. With a volatile amine the reaction can be carried out under pressure or, as in the case of dimethyl amine, by employing an aqueous solution of the amine and a slightly lower reaction temperature, i.e. about 45–50° C. In general, the secondary amine employed can be any di-substituted amine in which the substituents contain no active hydrogen. Typical amines which are suitable include N,N-lower alkyl amines such as N,N-dimethyl amine, N,N-diethyl amine, N-methyl-N-ethyl amine, N,N-dipropyl amine, N,N-diisopropyl amine, and N,N-dibutyl amine; N-lower alkyl anilines such as N-methyl aniline, N-ethyl aniline, N-propyl aniline, N-isopropyl aniline and N-butyl aniline; N-lower alkyl aralkyl amines such as N-methyl benzylamine, N-ethyl benzylamine, N-propyl benzylamine, N-isopropyl benzylamine and N-butyl benzylamine; N,N-dibenzylamine; and the heterocyclic amines piperidine, morpholine and pyrrolidine.

Another practical way of preparing the tertiary amines is to first react the secondary amine with the epihalohydrin to form the 1-di-substituted amino propylene-2,3-epoxide and then reacting the epoxide with the desired alkylated phenol to form the γ-alkylated phenoxy-β-hydroxy di-N-substituted propylamines. One advantage of this approach is that certain of the 1-di-substituted amino propylene-2,3-epoxides are commercially available intermediates.

The tertiary amine alcohol of the formula

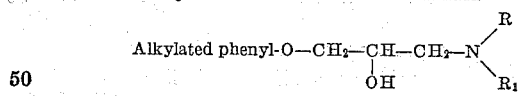

in then ethoxylated, suitably by heating and agitating a quantity thereof with about 0.5 to 1% by weight of sodium hydroxide at elevated temperature of about 160° C. or higher while introducing ethylene oxide into the agitated mixture. Such introduction of ethylene oxide converts the OH group in the above formula to

—(CH$_2$CH$_2$O)$_n$.H and the reaction is continued until "$n$," determined by weight increase in the reaction product reaches a desired value. This value of $n$, or the number of mols of ethylene oxide in the product, may vary from number 1 to about 100 with the generally preferred range being about 10 to 30 mols of ethylene oxide. These products which are normally liquids when the ethylene oxide content is relatively low become more viscous or even solid, although readily water-soluble, as the ethylene oxide content is increased. Depending upon the molecular weight of the alkyl phenyl moiety reduction of the ethylene oxide content below about 6 mols may reduce the water solubility, but even the relatively insoluble products have useful surface active and iodine complexing properties.

The ethoxylated tertiary amines are cationic in nature and readily form acid salts, while at the same time having moderate to good detergent properties.

The ethoxylated tertiary amines can readily be converted to corresponding quaternary ammonium compounds by reaction with a conventional quaternizing agent. The reaction, frequently exothermic in nature, can be carried out by stirring together equimolar amounts of the tertiary amine and quaternizing agent for an extended period of 3 to 4 hours at a temperature of about 50–60° C.

The resulting quaternary compounds possess all of the general advantages of the tertiary amines as surface active agents. They are, however, inherently more stable than the amines, particularly in acidic or basic media, and exhibit marked substantivity for many fabrics and fibrous materials.

Complexes of iodine with these compounds have no definite structure, since the amount of complexed iodine may be varied from a minimum amount to provide germicidal activity to a maximum amount which is the amount, generally about 25 to 35% by weight based upon the weight of the compound, which will dissolve in the particular compound. In such complexes there is a firm binding of the iodine, thus minimizing losses of iodine through vaporization. However, the gradual release of iodine in aqueous solution exerts its germicidal action.

Carrier iodine complexes with either a salt or quaternary ammonium derivative of the tertiary amine can be prepared by merely adding iodine crystals to a quantity of the carrier and stirring at a slightly elevated temperature, i.e. about 50–55° C., until the iodine is dissolved. The same procedure can be used with the tertiary amine per se, but has the disadvantage that in the presence of water a portion of the iodine will be consumed. It is preferable, therefore to first react the amine with an equivalent of a mineral acid or a suitable organic acid such as acetic acid or hydroxyacetic acid to form the corresponding salt, and then dissolve the iodine in the amine salt.

It is also practical to prepare the complexes under aqueous conditions having either the carrier, the iodine, or both components in aqueous systems prior to mixing and complexing. When using a tertiary amine carrier, or when desiring an acidified product using salt or quaternary ammonium carriers, the aqueous carrier can be acidified with the desired acid prior to mixing. In the case of amine carriers such acidification can be merely sufficient to effect salt formation, or it can be sufficient to also provide the desired pH control in the complex.

When preparing complexes under aqueous conditions, the available iodine to be included can suitably be supplied as an aqueous solution of iodine and water-soluble iodide, such as hydrogen iodide or alkali metal iodide. In such a solution the components are preferably present in the ratio of about 2 parts iodine to 0.8 to 1 part iodide. This addition of iodine in the form of an aqueous-iodide mixture substantially shortens the time for obtaining stable complexes. The special advantage of the use of iodine-iodide mixtures in preparing iodine complexes with iodophors is the subject matter of a co-pending application of one of us, Winicov and Schmidt, Serial No. 55,732, filed September 13, 1960, now U.S. Patent No. 3,028,299.

When preparing iodine complexes as above described, the amount of iodine employed will depend largely upon the degree of germicidal activity desired in the product. Thus, in some instances only a trace of iodine may be required. The upper limit of the amount of iodine is the solubility of the iodine in the particular carrier; and while this varies somewhat from one carrier to another, it is generally possible to complex as much as 25 to 35% of iodine based on the weight of the carrier.

Iodine complexes of the tertiary amine salts and quaternary ammonium compounds can also be prepared using iodine in the form of iodine chloride or iodine bromide, the second halogen providing a regenerative prolonging or enlarging of the germicidal activity of the iodine. Such complexes with iodine halide can be produced either by dissolving the iodine halide in the carrier, or by first dissolving the elemental iodine and then adding bromine or chlorine to form the halide in situ. It is to be understood that the invention disclosed and claimed herein as it pertains to iodine complexes also embraces complexes wherein the iodine is present as iodine chloride or iodine bromide.

The following examples will show how the procedures above described are applied in the preparation of a number of ethoxylated tertiary amines and salts and quaternary ammonium derivatives thereof, and how these are complexed with iodine in accordance with the present invention, but it is to be understood that these examples are given by way of illustration and not of limitation.

EXAMPLE 1

*Preparation of Alkylphenylglycidyl Ether*

To a mixture of one mole of commercial distilled alkylphenol and two moles of epichlorhydrin in a three-necked flask equipped with thermometer, stirrer and addition funnel, was added dropwise at 75–95° C. a solution of one mole sodium hydroxide in 80 mls. of water. The pH of the reaction was kept below ten; 4–5 hours were required to bring the reaction to completion. The oil layer was separated from the precipitated sodium chloride and thoroughly washed with several portions of water to remove all water soluble substances. Five mls. of acetic acid were added to the oil prior to the final wash to insure freedom from alkali. Excess epichlorhydrin was removed from the remaining organic mixture under reduced pressure. The resulting oil consisted mainly of a mixture of alkylphenylglycidyl ether and 2-hydroxy-3-(alkylphenoxy)-propyl chloride as a by-product. In order to convert the latter into the alkylphenylglycidyl ether, the mixture was treated with one additional mole of sodium hydroxide in 80 mls. of water. After the dropwise addition of the sodium hydroxide solution was completed, heating at 75–80° C. and stirring was continued for an additional three hours. The aqueous layer was withdrawn, the product washed several times with water to remove sodium chloride and excess alkali. As before, five mls. of acetic acid were added before the final wash. The remaining alkylphenylglycidyl ether was distilled under reduced pressure and gave a product of greater than 90% purity, as shown by conventional epoxide analysis. Pertinent data concerning three such alkylphenylglycidyl ethers is presented in the following table:

TABLE 1.—ALKYLATED PHENYL GLYCIDYL ETHERS

| Carbon Atoms in Alkyl Group | Distn. Range at 0.5 mm. | Analysis, Percent Epoxide |
| --- | --- | --- |
| 8 (octyl) | 120–130 | 98 |
| 9 (nonyl) | 130–140 | 95 |
| 12 (dodecyl) | 145–160 | 92 |

EXAMPLE 2

*Preparation of Tertiary Amines*

*Method A.*—One mole of secondary amine was added dropwise at 75–80° C. to one mole of alkylphenylglycidyl ether as prepared in Example 1. The reaction was generally exothermic, however additional heating and higher temperatures were needed in some cases to increase the yield of tertiary amine. In the case of dimethylamine, a 40% aqueous solution was used at 45–50° C. Pertinent data concerning nine such reactions is given in the following table:

TABLE 2.—ALKYLATED PHENOXY PROPANOL AMINES

| Alkyl Carbons in Alkylated Phenyl Group | Secondary Amine | Reaction Temp., °C. | Time, hrs. | Tertiary Amine (Yield), Percent |
|---|---|---|---|---|
| 9 | N-Methyl aniline | 150 | 2 | 88 |
| 9 | Dibutyl amine | 150 | 2 | 96 |
| 9 | Piperidine | 75–100 | 2 | 97.8 |
| 9 | Morpholine | 120 | 2 | 96.5 |
| 9 | Diethyl amine | 75– 80 | 16 | 95 |
| 9 | N-methyl benzyl amine | 110 | 2 | 92.8 |
| 9 | Dimethylamine | 45– 50 | 16 | 84 |
| 8 | Diethyl amine | 90 | 16 | 98 |
| 12 | do | 90 | 16 | 90 |

*Method B.*—88 gms. of nonyl phenol is reacted with 51.6 gms. (a molar equivalent of 1-diethyl amino propylene-2,3-epoxide by mixing the two liquids at room temperature and heating the mixture to about 75° C. At this point there is a slight exothermic reaction, and thereafter the temperature is increased to about 140–145° C. and held for about 6 hours. The γ-nonyl-phenoxy-β-hydroxy N,N-diethyl propylamine thus obtained after distillation is identical with the corresponding product as reported in Table 2 (item 5).

EXAMPLE 3

*Preparation of Polyethoxylated Tertiary Amines (Formula I)*

One hundred parts of tertiary amine as prepared in Example 2 and 0.5–1.0 part solid sodium hydroxide were charged to a reaction flask equipped with a high speed stirrer and submerged gas addition tube. The reaction flask was immersed in an oil bath maintained at 160° C. Sufficient ethylene oxide (measured by weight increase) was introduced so as to provide the molar amount of ethylene oxide specified in Table 3. All the ethoxylated compounds were water soluble and surface active. Salts of the ethoxylated amines are prepared by merely reacting the amine with a molar equivalent of a mineral acid or a suitable organic acid such as acetic acid or hydroxyacetic acid.

TABLE 3.—POLYETHOXYLATED TERTIARY AMINES

| Item | Alkyl Carbons in Alkylated Phenyl Group | Secondary Amine | Moles EtO |
|---|---|---|---|
| a | 9 | N-methyl aniline | 22 |
| b | 9 | Dibutyl amine | 22 |
| c | 9 | Piperidine | 20 |
| d | 9 | Morpholine | 16 |
| e | 9 | Diethyl amine | 22 |
| f | 9 | do | 50 |
| g | 9 | N-methyl benzyl amine | 22 |
| h | 9 | Dimethylamine | 20 |
| i | 8 | Diethyl amine | 35 |
| j | 12 | do | 19 |

EXAMPLE 4

*Preparation of Quaternary Ammonium Compounds*

To one mole of polyethoxylated tertiary amine prepared as described in Example 3 was added one mole of dimethyl sulfate (or methyl iodide) with stirring at 50°–60° C. The reaction was exothermic. The product was heated with stirring for 3–4 hours at 50–60° C. At the end of this time, there was no unquaternized amine in the final product (as determined by a non-aqueous titration in acetic acid, for amine, by perchloric acid). Pertinent data concerning several such quaternizing reactions are given in the following table. Aqueous solutions of these compounds were clear and surface active.

TABLE 4

| Item | Tertiary Amine | Quaternizing Agent | Moles EtO |
|---|---|---|---|
| a |  | $(CH_3)_2SO_4$ | 20 |
| b |  | $(CH_3)_2SO_4$ | 50 |
| c |  | $CH_3I$ | 11 |
| d |  | $CH_3I$ | 22 |
|  |  | $CH_3I$ | 50 |

EXAMPLE 5

*Preparation of Iodine Complexes*

Iodine complexes of the 10 tertiary amine compounds shown in Table 3 (in the form of salts thereof) were prepared using amounts of carrier, acid, and iodine as indicated in Table 5, the percent figures being on a weight/volume basis. The indicated acid (glycolic, phosphoric or hydrochloric) in concentrated aqueous solution was added to the amine to form the amine salt (generally with excess acid present) and the indicated amount of crystalline iodine was added with stirring while maintaining the internal temperature at about 50–55° C. When the iodine was all dissolved, water was added to give an aqueous concentrate of the complex having the weight/volume composition as indicated.

Similarly, the 5 quaternary ammonium compounds shown in Table 4 were combined with acid, complexed with iodine and diluted to form the concentrates identified as the last five items in Table 5. In these instances (salt formation not being involved) the acid employed acts wholly to provide acidity in the resulting concentrate.

When preparing the quaternary ammonium complexes the same results are obtained if the crystalline iodine is first dissolved in the carrier to effect complexing and the complex is then combined with the indicated acid and water to form the concentrate.

Similar concentrates also result when the indicated amount of iodine is added to the amine salt or the quaternary ammonium compound in the form of a solution of iodine in aqueous HI, NaI or KI in which the proportions of free iodine to iodide are approximately 2 to 0.8–1. This alternative procedure permits quicker dissolving or complexing of the iodine and leads directly to a stable concentrate.

TABLE 5.—IODINE COMPLEXES

| Identification of Carrier | Percent Carrier | Percent Acid | Percent Total Iod. | Percent Tit. Iod. |
|---|---|---|---|---|
| Table 3: | | | | |
| a | 10 | 10 Glyc | 1.75 | 1.15 |
| b | 10 | 10 Glyc | 1.75 | 1.27 |
| c | 10 | 10 Glyc | 1.75 | 1.17 |
| d | 25 | 10 Glyc | 6.4 | 4.76 |
| e | 20 | 15 H$_3$PO$_4$ | 2.9 | 2.2 |
| f | 15 | 0.2 HCl | 2.9 | 2.1 |
| g | 10 | 10 Glyc | 1.75 | 1.29 |
| h | 25 | 10 Glyc | 6.4 | 4.8 |
| i | 25 | 10 Glyc | 6.4 | 4.8 |
| j | 25 | 10 Glyc | 6.4 | 4.45 |
| Table 4: | | | | |
| a | 8.2 | 5 Glyc | 1.47 | 1.1 |
| b | 8.2 | 5 Glyc | 1.47 | 1.1 |
| c | 10 | 5 Glyc | 2.0 | 1.7 |
| d | 15 | 15 H$_3$PO$_4$ | 2.9 | 2.3 |
| e | 15 | none | 2.9 | 2.3 |

NOTE.—All percent figures are weight/volume.

In the foregoing tabulation it will be noted that most of the complexes were prepared with excess acid, and as such are particularly suited for use in the dairy industry and in other areas of environmental sanitation in which high concentrations of organic soil are present. The complex identified with carrier (Table 3, f), however, has essentially no excess acid, the amount of acid employed being merely sufficient for salt formation. Similarly the complex identified with carrier (Table 4, e) has no acid present. These latter complexes are typical of general purpose germicidal products for use in areas when high acidity may be unnecessary or undesirable.

It should also be understood that the several complexes varying in iodine content from about 1.1 to 4.8% titratable iodine represent practical products for commercial distribution, with the final preparation of use dilutions having the desired p.p.m. of iodine being in the discretion of the user in the light of the particular sanitizing, disinfecting or sterilizing job to be accomplished. In some instances, it may be practical to distribute as products aqueous preparations having higher or lower iodine content than indicated in the foregoing table, as well as anhydrous products in the form of the iodine complexes alone, or in combination with compatible solid diluents or extenders. In this connection, solid extenders may include paper, cloth or fibrous materials. Products in which the iodine complex is combined with a solid diluent or extender have practical advantages in storage and handling while readily releasing iodine for germicidal action in the presence of water or moisture.

Various changes and modifications in the iodine complexes and methods for preparing the same as herein disclosed may occur to those skilled in the art, and to the extent that such changes and modifications are embraced by the appended claims, it is to be understood that they constitute part of our invention.

We claim:

1. A germicidal composition consisting of a complex of iodine with a carrier selected from the group consisting of salts and quaternary ammonium derivatives of the tertiary amines of the structural formula:

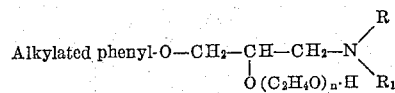

wherein the alkyl substituents in said alkylated phenyl group have a total of 6 to 18 carbon atoms, —NRR$_1$ is a secondary amino radical selected from the group consisting of N,N-lower di-alkyl amino, N-lower alkyl N-aryl amino, N-lower alkyl N-aralkylamino, N,N-diaralkylamino, piperidyl, morpholyl and pyrrolidyl radicals and $n$ is an integer from 1 to 100.

2. A germicidal composition consisting of a complex of iodine with a salt of an amine having the formula:

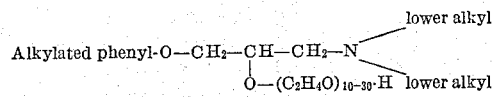

wherein the alkyl substituents in said alkylated phenyl group have a total of 6 to 18 carbon atoms.

3. A germicidal composition consisting of a complex of iodine with a quaternary ammonium derivative of an amine having the formula:

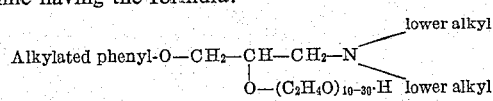

wherein the alkyl substituents in said alkylated phenyl group have a total of 6 to 18 carbon atoms.

4. A germicidal composition consisting of a complex of iodine with a salt of an amine having the formula:

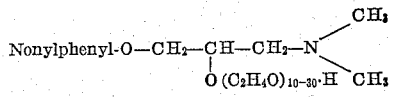

5. A germicidal composition as defined in claim 4 wherein said salt is the glycolic acid salt.

6. A germicidal composition consisting of a complex of iodine with a salt of an amine having the formula:

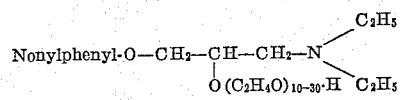

7. A germicidal composition as defined in claim 6 wherein said salt is the glycolic acid salt.

8. A germicidal composition as defined in claim 6 wherein said salt is the phosphoric acid salt.

9. A germicidal composition consisting of a complex of iodine with a salt of an amine having the formula:

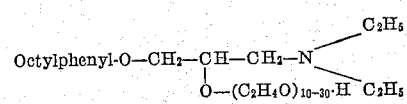

10. A germicidal composition as defined in claim 9 wherein said salt is the glycolic acid salt.

11. A germicidal composition consisting of a complex of iodine with a salt of an amine having the formula:

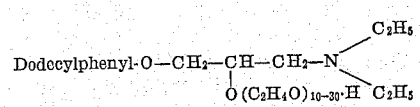

12. A germicidal composition as defined in claim 11 wherein said salt is the glycolic acid salt.

13. A germicidal composition consisting of a complex of iodine with a quaternary ammonium methiodide derivative of an amine having the formula:
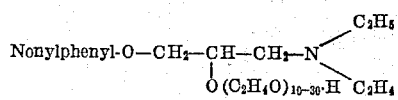
References Cited in the file of this patent
UNITED STATES PATENTS
| | | |
|---|---|---|
| 2,840,510 | Katz | June 24, 1958 |
| 2,868,686 | Shelanski | Jan. 13, 1959 |
| 2,931,777 | Shelanski | Apr. 5, 1960 |
| 3,028,427 | Winicov | Apr. 3, 1962 |